No. 606,786. Patented July 5, 1898.
W. A. KEMP.
CORRUGATED PIPE COMPRESSING MACHINE.
(Application filed Sept. 23, 1897.)
(No Model.) 2 Sheets—Sheet 2.
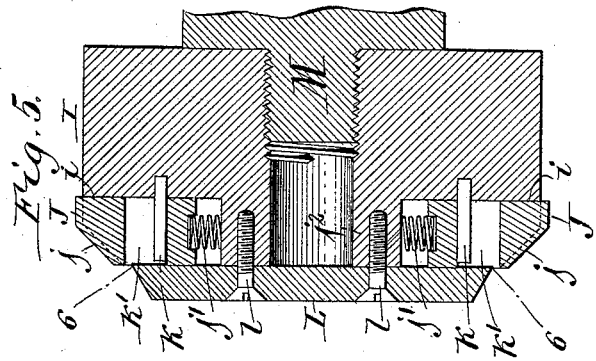
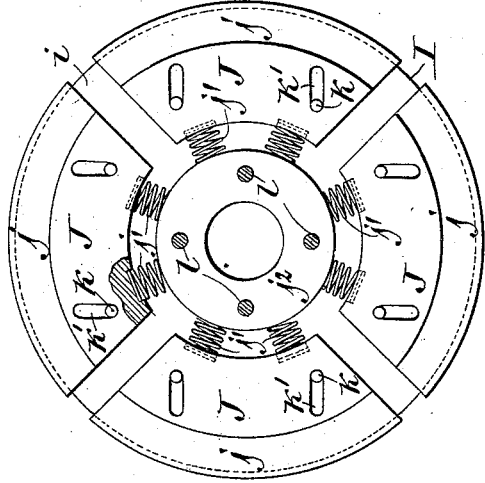
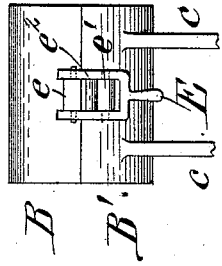
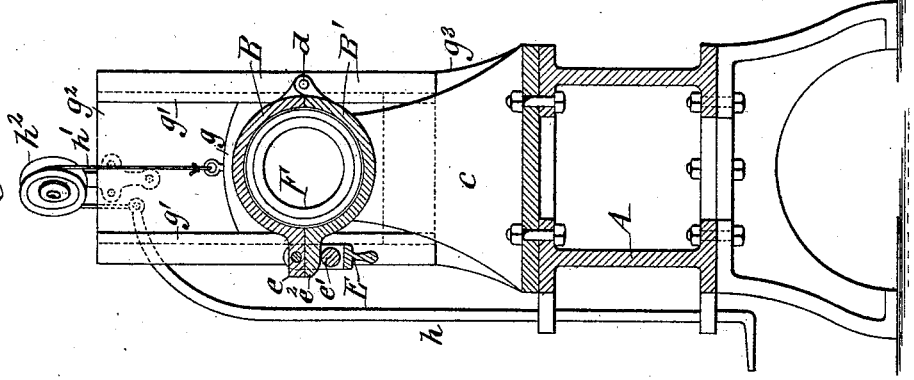
Witnesses:
Henry L. Deck
Chas. F. Burkhardt
William A. Kemp, Inventor.
By Wilhelm Bonner
Attorneys.

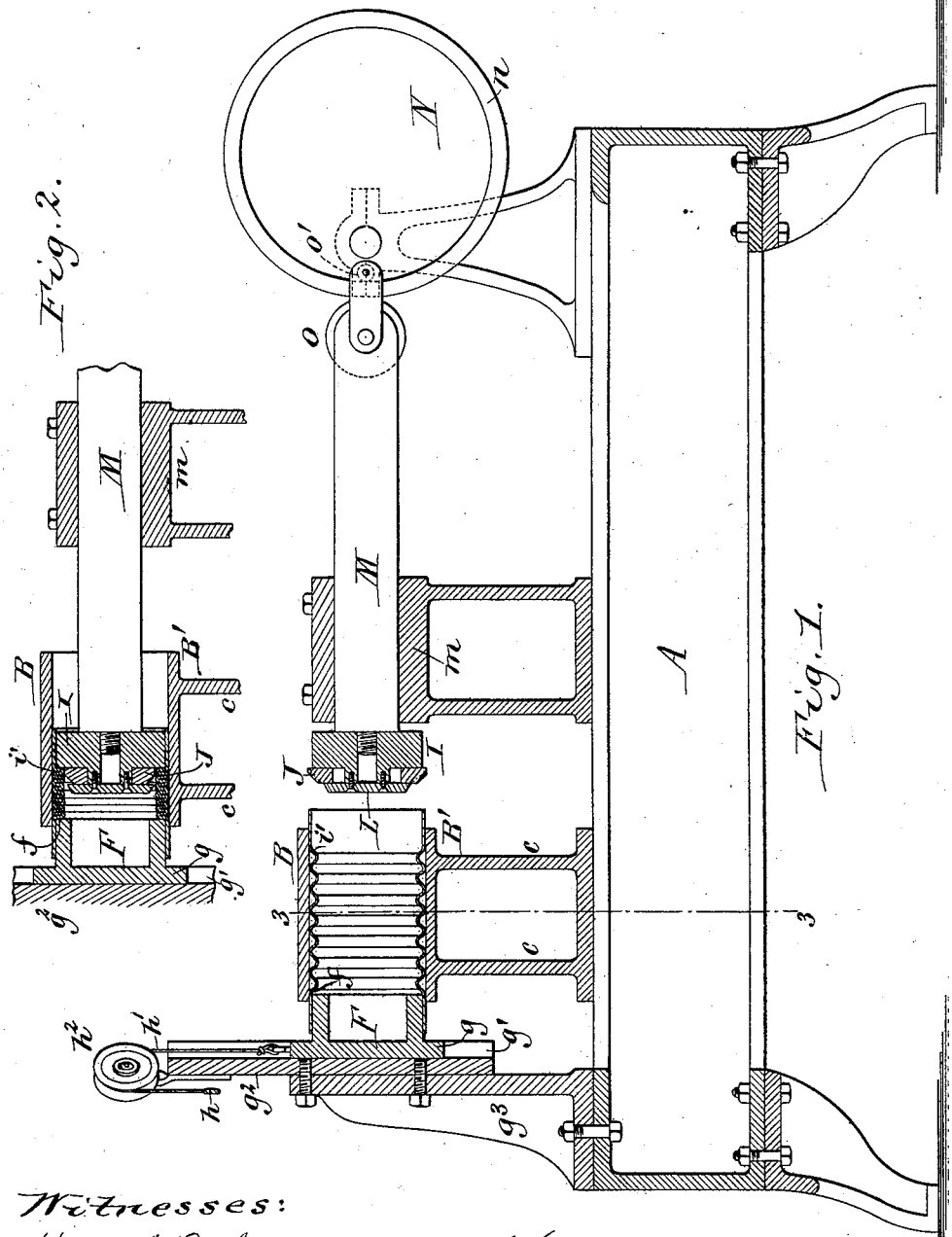

UNITED STATES PATENT OFFICE.

WILLIAM A. KEMP, OF TORONTO, CANADA.

CORRUGATED-PIPE-COMPRESSING MACHINE.

SPECIFICATION forming part of Letters Patent No. 606,786, dated July 5, 1898.

Application filed September 23, 1897. Serial No. 652,736. (No model.)

*To all whom it may concern:*

Be it known that I, WILLIAM A. KEMP, a subject of the Queen of Great Britain, residing at Toronto, in the county of York, in the Province of Ontario, Dominion of Canada, have invented new and useful Improvements in Corrugated-Pipe-Compressing Machines, of which the following is a specification.

In manufacturing a pipe-elbow according to my improved method, for which I have filed a separate application for patent September 23, 1897, Serial No. 652,737, a sheet of metal is first corrugated coarsely in its central portion, leaving the end portions plain or uncorrugated, and then bent into a tube or pipe, with the corrugations extending circumferentially around the pipe and forming cylindrical ends. The corrugations are then compressed so as to come rather closely together, and the pipe is finally bent into an elbow, whereby those portions of the corrugations which lie on the outer side of the bend are stretched or distended, while those portions of the corrugations which lie on the inner side of the bend remain in their compressed condition.

The object of this invention is the production of a simple and efficient machine whereby the compression of the corrugations in the pipe, as above described, is effected reliably and expeditiously.

In the accompanying drawings, consisting of two sheets, Figure 1 is a vertical longitudinal section of my compressing-machine, showing a coarsely-corrugated pipe in position ready for compressing the corrugations thereof. Fig. 2 is a fragmentary longitudinal section of the machine, showing the corrugations of the pipe compressed. Fig. 3 is a vertical cross-section in line 3 3, Fig. 1. Fig. 4 is a fragmentary front elevation of the pipe-holding device. Fig. 5 is a fragmentary longitudinal section of the plunger on an enlarged scale. Fig. 6 is a cross-section in line 6 6, Fig. 5.

Like letters of reference refer to like parts in the several figures.

A represents the bed or frame of the machine, and B B' the upper and lower holding-jaws, whereby the pipe is held in place during the operation of compressing its corrugations. Each of these jaws is semicylindrical and arranged horizontally, and the two jaws are adapted to bear against opposite sides of the corrugated portion of the pipe. The lower jaw B' is arranged on the upper ends of standards c, which are secured to the bed, and the upper jaw is pivoted on its rear side to the rear side of the lower jaw by horizontal pins d, passing through lugs on the jaws, as shown in Fig. 3, so that the upper jaw can be swung vertically toward and from the lower jaw. The front sides of the jaws are detachably connected by a hand-lever E, pivoted to a lug e on the front side of the upper jaw and provided with a roller e', which engages with the curved under side of a lug $e^2$ on the front side of the lower jaw.

F represents an abutment, preferably of cylindrical form, which fits into the cylindrical rear end of the pipe and bears against a shoulder f, formed in the pipe by the rearmost corrugation. This abutment is arranged on a vertically-movable slide g, which is guided in ways g', arranged on a supporting-plate $g^2$. The latter is secured to a standard $g^3$, arranged on the rear portion of the bed. The abutment and its slide are lowered by gravity and raised by means of a vertically-sliding treadle h, which is guided on the frame and connected with the slide by a lifting cord or chain h', passing around a roller $h^2$ on the upper end of the supporting-plate.

I represents a cylindrical plunger whereby the corrugations in the pipe are compressed and which has a horizontal reciprocating movement toward and from the front end of the pipe. This plunger during its forward movement passes into the cylindrical front end of the pipe and bears with its marginal portion i against a shoulder i', formed in the pipe by the foremost corrugation thereof, whereby the front portion of the pipe is moved toward the rear portion and the corrugations are pressed closely together. In order to prevent the plunger from striking the front edge of the pipe during the forward movement of the plunger, the latter is provided on its front side with a number of segmental guide-blocks J, which are capable of radial movement on the plunger. Each of these guide-blocks is provided on the outer edge of its front side with a beveled or inclined face j, and the block is yieldingly moved outwardly with its inclined face projecting beyond the periphery of the plunger by springs $j'$, interposed between the inner end of the block and a forward extension $j^2$ on the central portion of the plunger. The outward movement of the guide-blocks is limited by means of pins $k$, secured to the plunger and engaging with slots $k'$ in the guide-blocks. The several guide-blocks are held against the front side of the plunger by a retaining plate or disk L, bearing against the front side of the guide-blocks and secured to the extension of the plunger by screws $l$.

During the initial portion of the forward movement of the plunger its guide-blocks project beyond the periphery of the plunger, as represented in full lines, Fig. 6, so that their inclined faces engage with the front edge of the pipe. During the continued forward movement of the plunger the guide-blocks are partially retracted by the wedging action of said inclined faces against the front edge of the pipe until the blocks are flush with the periphery of the plunger, as represented by the dotted lines in Fig. 6, whereby the cylindrical front portion of the pipe is directed over the periphery of the plunger. The guide-blocks remain in this partially-retracted position until their inclined faces engage with the foremost corrugation in the pipe, when the blocks are still further retracted, as shown in Fig. 2, so as to clear the corrugations and permit the marginal portion of the plunger to bear against the foremost corrugation. During the remainder of the forward movement of the plunger after the latter engages with its marginal portion against the foremost corrugation the front portion of the pipe is carried toward the rear portion thereof and all of the corrugations are compressed uniformly. After the plunger has compressed the corrugations it is moved backwardly and the upper holding-jaw is raised from the pipe, permitting the latter to be raised out of the lower jaw by depressing the treadle and to be removed from the abutment. Another pipe with uncompressed corrugations is then placed on the abutment and the latter is lowered until the pipe rests in the lower jaw, when the upper jaw is clamped over the pipe and the compressing operation is resumed, as before described.

The plunger is arranged on the rear end of a horizontally-sliding bar or rod M, which slides in a guide $m$ on the bed, and the plunger may be reciprocated by any suitable and well-known mechanism—for instance, as shown in the drawings, by means of a rotary disk N, journaled on the frame and provided with a cam-flange $n$ and two rollers $o$ $o'$, connected with the guide-rod and engaging with opposite sides of the cam-flange.

The plunger and the abutment form two compressing-jaws between which the corrugated portion of the pipe is compressed whether the machine is organized, as shown, so that one of these jaws is stationary and the other moved or whether both are moved to effect the act of compression. Each of these compressing-jaws has a diameter which is smaller than the internal diameter of the pipe, so that the jaw can enter the pipe, and larger than the internal diameter of the corrugations, so that the jaw engages in the pipe against the inner surface of the adjacent outermost corrugation. The two holding-jaws form a divided cylindrical housing which incloses the corrugated portion of the pipe and which has an internal diameter about equal to the external diameter of the corrugations, so as to support and guide the corrugations during the act of compression.

I claim as my invention—

1. In a machine for compressing the corrugated portion of a sheet-metal pipe, the combination of two compressing-jaws, each of a diameter which enables the jaw to enter the pipe and of larger diameter than the internal diameter of the corrugations, whereby each jaw engages within the pipe against the adjacent outermost corrugation and the corrugated portion of the pipe is compressed longitudinally between the jaws, substantially as set forth.

2. In a machine for compressing the corrugated portion of a sheet-metal pipe, the combination with two compressing-jaws, each of a diameter which enables the jaw to enter the pipe and of larger diameter than the internal diameter of the corrugations, and a divided cylindrical housing which surrounds the corrugated portion of the pipe between the compressing-jaws, substantially as set forth.

3. In a machine for compressing the corrugated portion of a sheet-metal pipe, the combination with a divided cylindrical housing which surrounds the corrugated portion of the pipe, of a plunger engaging in one end of the pipe against the adjacent outermost corrugation, and an abutment engaging in the other end of the pipe against the adjacent outermost corrugation and capable of movement toward and from the center of the pipe, substantially as set forth.

4. In a machine for compressing the circumferential corrugations of sheet-metal pipes, the combination with jaws for holding the central portion of the pipe, of a plunger engaging with one end of the pipe, an abutment engaging with the other end of the pipe, a vertically-movable slide supporting the abutment, and a lifting-cord passing around a roller and connected with its opposite end to a treadle, substantially as set forth.

5. In a machine for compressing the circumferential corrugations of sheet-metal pipes, the combination with a pipe-holding device, of a plunger adapted to engage in the end portion of the pipe and guides arranged on the plunger and capable of movement toward and from the center thereof, substantially as set forth.

6. In a machine for compressing the circumferential corrugations of sheet-metal pipes, the combination with a pipe-holding device, of a cylindrical plunger adapted to enter the end portion of the pipe, and laterally-movable guides arranged on the plunger and provided on the outer edge of their front sides with inclined faces, substantially as set forth.

7. In a machine for compressing the circumferential corrugations of sheet-metal pipes, the combination with a pipe-holding device, of a cylindrical plunger adapted to enter the end portion of the pipe, of segmental guide-blocks capable of moving radially on the front side of the plunger and provided on the front sides of their outer ends with inclined faces, springs interposed between the plunger and the guide-blocks, pins arranged on the plunger and engaging with slots in the guide-blocks, and a retaining-disk secured to the plunger and bearing against the front sides of the guide-blocks, substantially as set forth.

Witness my hand this 20th day of September, 1897.

WILLIAM A. KEMP.

Witnesses:
W. FRANCIS,
F. MCCARTHY.